United States Patent
Xu et al.

(10) Patent No.: US 12,199,444 B2
(45) Date of Patent: Jan. 14, 2025

(54) PHOTOVOLTAIC DEVICE, PHOTOVOLTAIC INVERTER, SYSTEM, AND POWER LIMIT CONTROL METHOD

(71) Applicant: Huawei Digital Power Technologies Co., Ltd., Guangdong (CN)

(72) Inventors: Jialong Xu, Shenzhen (CN); Zhiwu Xu, Shenzhen (CN); Yongbing Gao, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 2 days.

(21) Appl. No.: 18/106,996

(22) Filed: Feb. 7, 2023

(65) Prior Publication Data

US 2023/0187944 A1    Jun. 15, 2023

Related U.S. Application Data

(63) Continuation of application No. PCT/CN2020/113705, filed on Sep. 7, 2020.

(51) Int. Cl.
*H02J 3/46* (2006.01)
*H02M 1/00* (2007.01)
(Continued)

(52) U.S. Cl.
CPC ........... *H02J 3/466* (2020.01); *H02J 2300/26* (2020.01); *H02M 1/0009* (2021.05); *H02M 3/157* (2013.01); *H02M 7/539* (2013.01)

(58) Field of Classification Search
CPC ........ H02J 3/466; H02J 2300/26; H02J 3/381; H02J 3/48; H02M 1/0009; H02M 3/157;
(Continued)

(56) References Cited

U.S. PATENT DOCUMENTS

| | | | |
|---|---|---|---|
| 2013/0046416 A1 | 2/2013 | Osako et al. | |
| 2014/0062209 A1* | 3/2014 | Liu | G05F 5/00 323/299 |

(Continued)

FOREIGN PATENT DOCUMENTS

| | | |
|---|---|---|
| CN | 102185506 A | 9/2011 |
| CN | 102723740 A | 10/2012 |

(Continued)

*Primary Examiner* — Lincoln D Donovan
*Assistant Examiner* — Alex W Lam

(57) ABSTRACT

This application discloses a photovoltaic device, a photovoltaic inverter, a system, and a power limit control method. The device includes a DC-DC converter circuit, an inverter circuit, and a controller. An input end of the DC-DC converter circuit is connected to a photovoltaic array, and an output end of the DC-DC converter circuit is connected to an input end of the inverter circuit. The controller is configured to: receive a power scheduling instruction, where the power scheduling instruction carries a power reference value; and when the power reference value is less than a power at a maximum power point, reduce an input current of the DC-DC converter circuit; or when an input voltage of the DC-DC converter circuit is greater than or equal to a preset voltage, increase an input current of the DC-DC converter circuit until an output power of an inverter becomes consistent with the power reference value.

13 Claims, 10 Drawing Sheets

(51) Int. Cl.
*H02M 3/157* (2006.01)
*H02M 7/539* (2006.01)

(58) Field of Classification Search
CPC .......... H02M 7/539; G05F 1/67; Y02E 10/50; Y02E 10/56; H02S 50/00
See application file for complete search history.

(56) References Cited

U.S. PATENT DOCUMENTS

2017/0346289 A1\* 11/2017 Park .................... H02J 3/38
2019/0173287 A1\* 6/2019 Ge ...................... H02J 7/35

FOREIGN PATENT DOCUMENTS

| | | |
|---|---|---|
| CN | 104579153 A | 4/2015 |
| CN | 105978043 A | 9/2016 |
| CN | 107769260 A | 3/2018 |
| CN | 107154780 B | 4/2019 |
| KR | 20140071028 A | 6/2014 |

\* cited by examiner

PHOTOVOLTAIC DEVICE, PHOTOVOLTAIC INVERTER, SYSTEM, AND POWER LIMIT CONTROL METHOD

CROSS-REFERENCE TO RELATED APPLICATIONS

This application is a continuation of International Application No. PCT/CN2020/113705, filed on Sep. 7, 2020, the disclosure of which is hereby incorporated by reference in its entirety.

TECHNICAL FIELD

This application relates to the field of photovoltaic power generation technologies, and in particular, to a photovoltaic device, a photovoltaic inverter, a system, and a power limit control method.

BACKGROUND

Currently, in order to improve photovoltaic power generation efficiency, a photovoltaic system is usually controlled to operate at a maximum power point. However, due to impact of many factors, such as DC overload limit, power grid dispatching, power factor limit, power limit, and voltage out of range, the photovoltaic system is not always operating at the maximum power point during actual operation.

FIG. 1 shows a P-V curve graph of a photovoltaic module.

It can be seen from the figure that the P-V curve of the photovoltaic module shares similar features with a parabola. When the photovoltaic module is operating at a power, the photovoltaic module can correspondingly output two different voltages. As shown in FIG. 1, for a power P1, the photovoltaic module can output a first voltage U1, or can output a second voltage U2. Clearly, the second voltage U2 located to the right of a voltage U0 corresponding to a maximum power point Pmax is greater than the first voltage U1 located to the left of U0. U1 corresponds to an operating point B, and U2 corresponds to an operating point A.

Currently, when the photovoltaic system needs to operate with a limited power, that is, a limited output power, referred to as the limited power for short, the output voltage of the photovoltaic module is usually controlled to be U2. Specifically, the output voltage of the photovoltaic module can be increased by reducing an output current of the photovoltaic module, to reduce an output power of an inverter, despite the fact that the photovoltaic module is operating in a state of a high voltage and a low current.

However, the foregoing control manner increases an input voltage of a pre-stage circuit of the inverter. A boost circuit in the pre-stage circuit of the inverter leads to overvoltage of a DC bus of the inverter, and the voltage may exceed a voltage stress that a switching device can withstand. A buck circuit in the pre-stage circuit of the inverter results in an increase of a loss of the buck circuit and electric energy conversion efficiency is thus reduced.

SUMMARY

This application provides a photovoltaic device, a photovoltaic inverter, a system, and a power limit control method, to prevent DC bus overvoltage during power limiting, reduce a voltage stress of a switching device, and improve electric energy conversion efficiency.

A photovoltaic device provided in an embodiment of this application is not specifically limited to a specific category, and a size of a photovoltaic power station to which the photovoltaic device is applied is not limited, either. For example, the photovoltaic device may be a two-stage inverter. To be specific, the two-stage inverter includes both a DC-DC converter circuit and an inverter circuit. In this case, the inverter implements power limit control. In addition, the photovoltaic device may alternatively be a combiner box. The combiner box and an inverter are separately disposed. An output end of the combiner box is connected to an input end of the inverter. In this case, the combiner box implements power limit control.

The photovoltaic device includes: a DC-DC converter circuit, an inverter circuit, and a controller. An input end of the DC-DC converter circuit is connected to a photovoltaic array, and an output end of the DC-DC converter circuit is connected to an input end of the inverter circuit. The controller receives a power scheduling instruction. For example, the power scheduling instruction received from an upper computer carries a power reference value. For example, when the power reference value is a power at a maximum power point, an inverter is controlled to perform MPPT, so that the inverter outputs the power at the maximum power point. When the power reference value is less than the power at the maximum power point, an input current of the DC-DC converter circuit is reduced during power limiting, and an input voltage of the DC-DC converter circuit increases naturally. As the input current of the DC-DC converter circuit continues to decrease, the input voltage of the DC-DC converter circuit increases gradually. However, when the input voltage is increased to a degree that exceeds a preset voltage, a control policy is changed. That is, the input current of the DC-DC converter circuit is increased instead of being reduced, until an output power of the inverter becomes consistent with the power reference value.

It can be learned from an IV curve that when I increases, the input voltage of the DC-DC converter circuit is forced to decrease and thus the input voltage of the DC-DC converter circuit becomes lower than the preset voltage, thereby avoiding DC bus overvoltage and protecting a DC bus capacitor connected between a DC positive bus and a DC negative bus and each switching device in the photovoltaic device. If the voltage is excessively high, the voltage may exceed a voltage stress of the switching device and damage the switching device. In addition, for a buck circuit, an electric energy loss may be reduced, and power generation efficiency may be improved.

The controller usually reduces an output power by reducing an input current, that is, by performing closed-loop control on the input current. The controller is configured to: reduce an input current reference value of the DC-DC converter circuit, and control decrease of the input current of the DC-DC converter circuit based on the input current reference value, where the input voltage of the DC-DC converter circuit increases as the input current decreases.

To avoid occurrence of overvoltage in a case in which the input voltage exceeds a limit, when the input voltage of the DC-DC converter circuit is greater than or equal to the preset voltage, the controller needs to forcibly increase the input current, that is, increase an input current reference value of the DC-DC converter circuit, and control increase of the input current of the DC-DC converter circuit based on the input current reference value. Based on the IV curve, when the input current of the DC-DC converter circuit is increased, the input voltage of the DC-DC converter circuit is forcibly decreased, thereby avoiding the DC bus overvoltage or a case in which the voltage exceeds the voltage stress of the switching device caused by the overvoltage.

When the power reference value is greater than or equal to the power at the maximum power point, the controller controls the output power of the inverter to be the power at the maximum power point, that is, performs MPPT control.

To protect the switching devices from being damaged by the overvoltage, a value of the preset voltage may be obtained based on a principle that the value is less than a voltage stress of a switching device in the DC-DC converter circuit, and is less than a voltage stress of a switching device in the inverter circuit.

The DC-DC converter circuit and the inverter circuit are integrated in the inverter; and the controller is a controller of the inverter. In addition, the controller may alternatively be a controller in a photovoltaic power station, and power limit control may be implemented as long as the controller can communicate with the DC-DC converter circuit.

When the photovoltaic power station needs to improve an output capability, a combiner box is usually required to combine outputs of a plurality of photovoltaic arrays. For example, the combiner box includes a plurality of DC-DC converter circuits, and the DC-DC converter circuits are integrated in the combiner box. An output end of the combiner box is connected to the input end of the inverter circuit; and the controller is a controller of the combiner box. The controller may alternatively be a controller in a photovoltaic power station, and power limit control may be implemented as long as the controller can communicate with the DC-DC converter circuit.

An embodiment of this application further provides a photovoltaic inverter. The photovoltaic device provided in the foregoing embodiment includes the DC-DC converter circuit. However, the photovoltaic inverter provided in this embodiment does not include a DC-DC converter circuit, but includes an inverter circuit and a controller, that is, a single-stage inverter. An input end of the inverter circuit is connected to a photovoltaic array, and the inverter circuit is configured to convert a direct current output by the photovoltaic array into an alternating current output. The controller is configured to: receive a power scheduling instruction, where the power scheduling instruction carries a power reference value; and when the power reference value is less than a power at a maximum power point, reduce an output current of the photovoltaic array, to increase an output voltage of the photovoltaic array; or when an output voltage of the photovoltaic array is greater than or equal to a preset voltage, increase an output current of the photovoltaic array, to reduce the output voltage of the photovoltaic array until an output power of the inverter becomes consistent with the power reference value.

The inverter provided in this embodiment can protect a switching device in the inverter circuit from impact of a high voltage and keep a voltage lower than a voltage stress of the switching device during power limit control, so that the inverter circuit operates safely and stably. Moreover, a DC bus capacitor is not impacted by the high voltage, to protect safety of the capacitor. ADC bus of the inverter provided in this embodiment is a DC bus of an input end of the inverter. In other words, a DC bus voltage is a voltage of the input end of the inverter. The switching device is a switching device of the inverter.

Because the inverter provided in this embodiment does not include a DC-DC converter circuit, an input current of the inverter circuit is the output current of the photovoltaic array, and the output current of the photovoltaic array is controlled to regulate the output power of the inverter. The controller reduces an output current reference value of the photovoltaic array, and controls decrease of the output current of the photovoltaic array based on the output current reference value, where the output voltage of the photovoltaic array increases as the output current decreases.

When the output voltage of the photovoltaic array is greater than or equal to the preset voltage, the controller increases an output current reference value of the photovoltaic array, and controls increase of the output current of the photovoltaic array based on the output current reference value. It can be learned from the IV curve that when the output current of the photovoltaic array increases, the output voltage of the photovoltaic array is forcibly decreased, so as to avoid a case in which the output voltage of the photovoltaic array exceeds the preset voltage. In this way, an input voltage of the inverter does not exceed the preset voltage, thereby protecting the switching device and the DC bus capacitor of the inverter.

When the power reference value is greater than or equal to the power at the maximum power point, the controller controls the output power of the inverter to be the power at the maximum power point, that is, performs maximum power point tracking (MPPT).

An embodiment of this application further provides a photovoltaic system, including the photovoltaic device described above or the photovoltaic inverter described above, and further including a photovoltaic array. When the photovoltaic device is included, the photovoltaic array is connected to an input end of the photovoltaic device. When the photovoltaic inverter is included, the photovoltaic array is connected to an input end of the photovoltaic inverter.

The photovoltaic system includes the photovoltaic inverter described in the foregoing embodiment, and the photovoltaic inverter includes an inverter circuit and a controller. Because the inverter can control an input voltage to be less than a preset voltage when power limit control is performed, a switching device and a DC bus capacitor can be better protected, and DC bus overvoltage can be avoided.

An embodiment of this application further provides a power control method for photovoltaic power generation, including: receiving a power scheduling instruction, where the power scheduling instruction carries a power reference value; and when the power reference value is less than a power at a maximum power point, reducing an output current of a photovoltaic array, to increase an output voltage of the photovoltaic array; or when an output voltage of a photovoltaic array is greater than or equal to a preset voltage, increasing an output current of the photovoltaic array, to reduce the output voltage of the photovoltaic array until an output power of an inverter becomes consistent with the power reference value.

It can be learned from the IV curve that when I increases, an input voltage of a DC-DC converter circuit is forced to decrease and thus the input voltage of the DC-DC converter circuit becomes lower than the preset voltage, thereby avoiding DC bus overvoltage and protecting a DC bus capacitor connected between a DC positive bus and a DC negative bus and each switching device in a photovoltaic device. If the voltage is excessively high, the voltage may exceed a voltage stress of the switching device and damage the switching device. In addition, for a buck circuit, an electric energy loss may be reduced, and power generation efficiency may be improved.

The reducing an output current of a photovoltaic array specifically includes: reducing an output current reference value of the photovoltaic array, and controlling decrease of the output current of the photovoltaic array based on the output current reference value. It can be learned from the IV curve that when the output current of the photovoltaic array decreases, the output voltage of the photovoltaic array increases as the output current decreases, that is, the output voltage of the photovoltaic array is forcibly increased.

The output power of the inverter may be adjusted by adjusting the current reference value, that is, by adjusting the current to implement the power adjustment. The increasing an output current of the photovoltaic array when the output voltage of the photovoltaic array is greater than or equal to the preset voltage specifically includes: when the output voltage of the photovoltaic array is greater than or equal to the preset voltage, increasing the output current reference value of the photovoltaic array, and controlling increase of the output current of the photovoltaic array based on the output current reference value.

The method further includes: when the power reference value is greater than or equal to the power at the maximum power point, controlling the output power of the inverter to be the power at the maximum power point, that is, performing maximum power point tracking MPPT.

An embodiment of this application further provides a power control apparatus for photovoltaic power generation, including:
  a receiving unit, configured to receive a power scheduling instruction for an inverter, where the power scheduling instruction carries a power reference value;
  a current reduction unit, configured to: when the power reference value is less than a power at a maximum power point, reduce an output current of a photovoltaic array, to increase an output voltage of the photovoltaic array; and
  a current increasing unit, configured to: when the output voltage of the photovoltaic array is greater than or equal to a preset voltage, increase the output current of the photovoltaic array, to reduce the output voltage of the photovoltaic array until an output power of the inverter becomes consistent with the power reference value.

The current reduction unit specifically includes a current reduction module, configured to: reduce an output current reference value of the photovoltaic array, and control decrease of the output current of the photovoltaic array based on the output current reference value, where the output voltage of the photovoltaic array increases as the output current decreases.

The current increasing unit specifically includes a current increasing module, configured to: when the output voltage of the photovoltaic array is greater than or equal to the preset voltage, increase the output current reference value of the photovoltaic array, and control increase of the output current of the photovoltaic array based on the output current reference value.

The apparatus further includes a control unit, configured to: when the power reference value is greater than or equal to the power at the maximum power point, control the output power of the inverter to be the power at the maximum power point.

It can be learned from the foregoing technical solutions that the embodiments of this application have the following advantages:

The photovoltaic device includes: the DC-DC converter circuit, the inverter circuit, and the controller. When the output power of the inverter is limited, the input current of the DC-DC converter circuit is reduced, and it can be learned from the current-voltage IV curve of a photovoltaic module that the input voltage of the DC-DC converter circuit increases naturally. Along with the continuous decrease of the input current of the DC-DC converter circuit, the input voltage of the DC-DC converter circuit increases gradually. However, when the input voltage is increased to a degree that exceeds the preset voltage, the control policy is changed. That is, the input current of the DC-DC converter circuit is increased instead of being decreased. It can be learned from the IV curve that when I increases, the input voltage of the DC-DC converter circuit is forced to decrease and thus the input voltage of the DC-DC converter circuit becomes lower than the preset voltage, thereby avoiding DC bus overvoltage and protecting the DC bus capacitor connected between the DC positive bus and the DC negative bus and each switching device in the photovoltaic device. If the voltage is excessively high, the voltage may exceed the voltage stress of the switching device and damage the switching device. In addition, for the buck circuit, the electric energy loss may be reduced, and the power generation efficiency may be improved.

DESCRIPTION OF EMBODIMENTS

Figure 1:
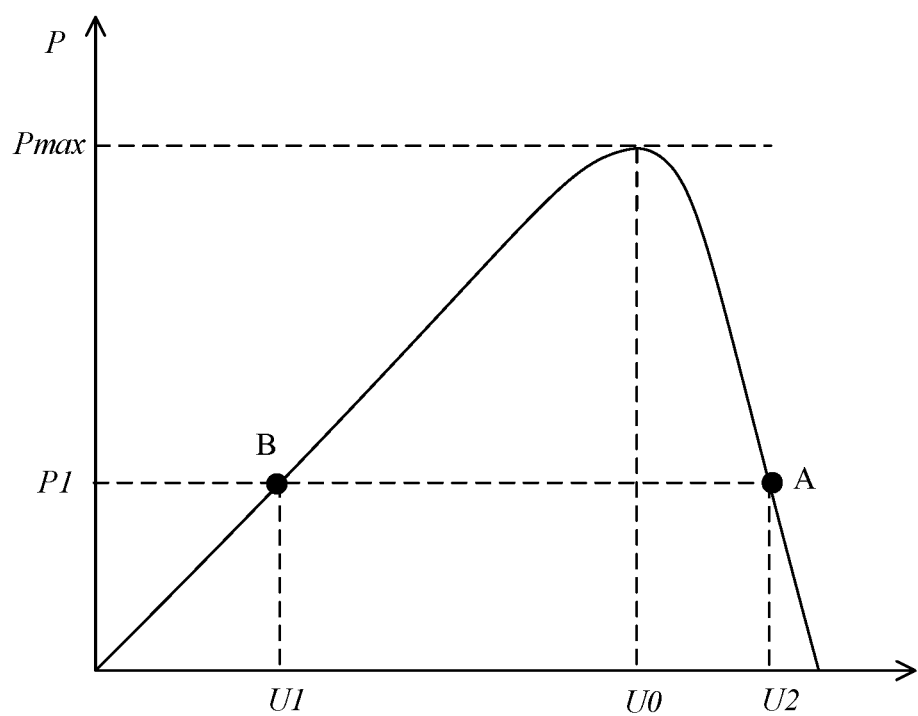
FIG. 1 is a curve graph of power and voltage PV of a photovoltaic module.

To make persons skilled in the art better understand technical solutions provided in embodiments of this application, a PV curve of a photovoltaic module is first described with reference to FIG. 1. It can be seen from FIG. 1 that, except a power Pmax at a maximum power point, powers at other power points each correspond to two voltages. Usually, to maximize an output power and maximize power generation efficiency, an inverter is controlled to perform maximum power point tracking (MPPT), that is, the inverter is controlled to operate at the maximum power point.

Currently, for the sake of operating stability, when power limit control is performed, the inverter is usually controlled to operate at a point to the right of the maximum power point. For example, a point A in the figure is a point to the right of the maximum power point. For ease of description, a point to the right of a power is called a first operating point, and a point to the left of the same power is called a second operating point (a point B in FIG. 1).

It is assumed that, for all cases of power limiting, the inverter is controlled to operate at the first operating point to the right. When a voltage is relatively high, there is a DC-DC converter circuit in a pre-stage circuit of an inverter circuit, the DC-DC converter circuit is a step-up circuit, for example, a boost circuit, and an output voltage of a photovoltaic array is relatively large, the output voltage becomes higher after the boost circuit boosts the relatively large input voltage, which may easily cause overvoltage of an input side, that is, a DC bus, of the inverter circuit, and damage the circuit, for example, damage a DC bus capacitor. When the DC-DC converter circuit in the pre-stage circuit of the inverter circuit is a step-down circuit, for example, a buck circuit, and an output voltage of a photovoltaic array is relatively large, the buck circuit needs to perform step-down conversion on the relatively large output voltage of the photovoltaic array, which may cause greater damage and affect the photovoltaic power generation efficiency. When there is the DC-DC converter circuit, an input voltage of the DC-DC converter circuit is the output voltage of the photovoltaic array.

The DC-DC converter circuit may be a boost circuit or buck circuit, or may alternatively be a buck/boost circuit. A specific implementation form of the DC-DC converter circuit is not specifically limited in this embodiment of this application. In addition, the DC-DC converter circuit can be either isolated or non-isolated.

Therefore, to resolve the technical problem, according to the technical solutions provided in the embodiments of this application, when an output power of the inverter is limited, differential treatment is performed based on the output voltage of the photovoltaic array, that is, based on a value of the input voltage of the DC-DC converter circuit. The power limit control is performed dynamically, and the inverter is not always controlled to operate at the first operating point. Specifically, determining may be performed based on the value of the input voltage of the DC-DC converter circuit. When the input voltage of the DC-DC converter circuit is relatively large, that is, greater than a preset voltage, the inverter is controlled to operate at the second operating point. Because a voltage at the second operating point is lower than that at the first operating point, DC bus overvoltage can be prevented. In addition, if the DC-DC converter circuit is the step-down circuit, power consumption can be reduced and the power generation efficiency can be improved.

A specific photovoltaic device used in the technical solutions is not specifically limited to a specific category in the embodiments of this application, and a size of a photovoltaic power station is not specifically limited, either. For example, the photovoltaic device may be a two-stage inverter. To be specific, the two-stage inverter includes both a DC-DC converter circuit and an inverter circuit. In this case, the inverter implements power limit control. In addition, the photovoltaic device may alternatively be a combiner box. The combiner box and an inverter are separately disposed. An output end of the combiner box is connected to an input end of the inverter. In this case, the combiner box implements power limit control.

Photovoltaic Device Embodiment 1

Figure 2:
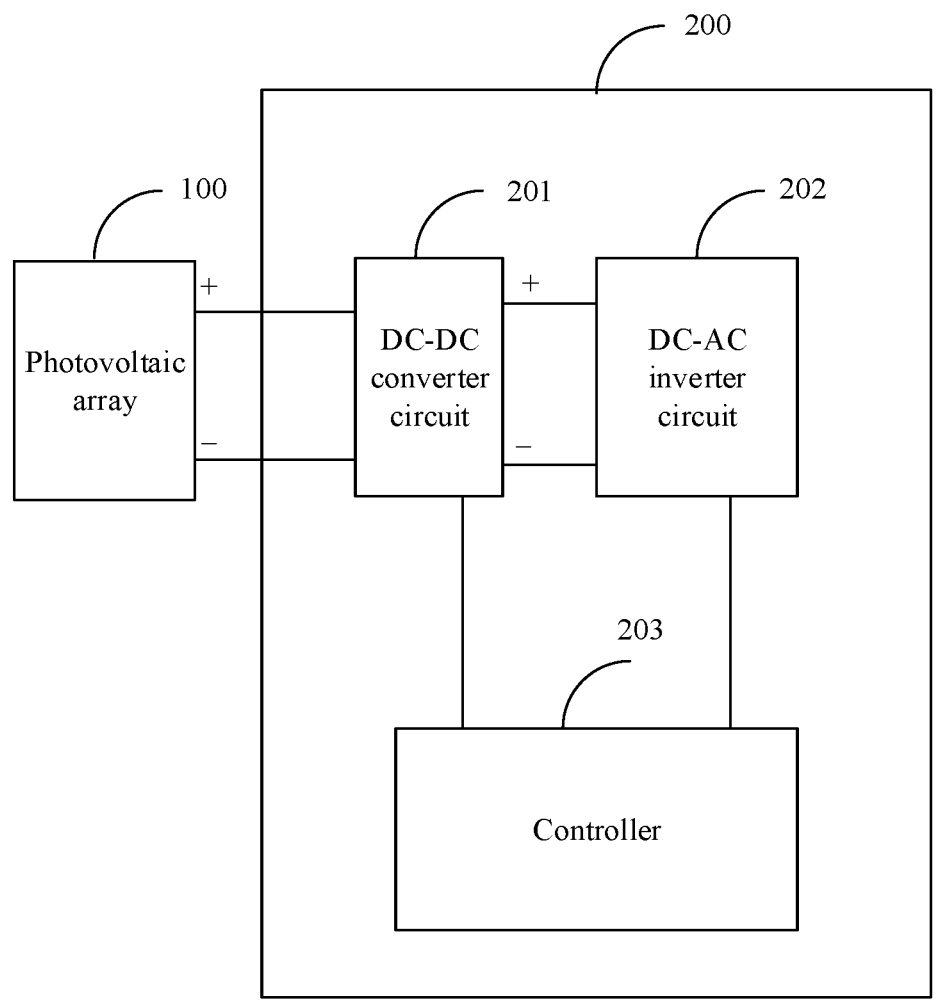
FIG. 2 is a schematic diagram of a photovoltaic device according to an embodiment of this application.

FIG. 2 is a schematic diagram of a photovoltaic device 200 according to an embodiment of this application.

The photovoltaic device 200 provided in this embodiment includes a DC-DC converter circuit 201, a DC-AC inverter circuit 202, and a controller 203.

An input end of the DC-DC converter circuit 201 is connected to a photovoltaic array 100, and an output end of the DC-DC converter circuit 201 is connected to an input end of the inverter circuit 202.

The controller 203 is configured to: receive a power scheduling instruction for an inverter, where the power scheduling instruction carries a power reference value; and when the power reference value is less than a power at a maximum power point, reduce an input current of the DC-DC converter circuit, to increase an input voltage of the DC-DC converter circuit; or when an input voltage of the DC-DC converter circuit is greater than or equal to a preset voltage, increase an input current of the DC-DC converter circuit, to reduce the input voltage of the DC-DC converter circuit until an output power of the inverter becomes consistent with the power reference value.

The power scheduling instruction received by the controller 203 may be received from an upper computer, or may be received from a control center of a photovoltaic power station. FIG. 2 is only a simple schematic diagram. For example, the photovoltaic power station includes a plurality of photovoltaic devices, and the upper computer is configured to control power output of the plurality of photovoltaic devices. The photovoltaic power station is responsible for power control of the photovoltaic devices in a unified manner, and delivers power scheduling instructions to the photovoltaic devices, where the power scheduling instructions carry power reference values. The photovoltaic devices control, based on the power reference values, inverters to output powers consistent with the power reference values. For example, when the power reference value is the power at the maximum power point, the inverter is controlled to perform MPPT, so that the inverter outputs the power at the maximum power point. If the power reference value is lower than the power at the maximum power point, power limit control is required, that is, the output power of the inverter is limited to being lower than the power at the maximum power point.

Figure 3:
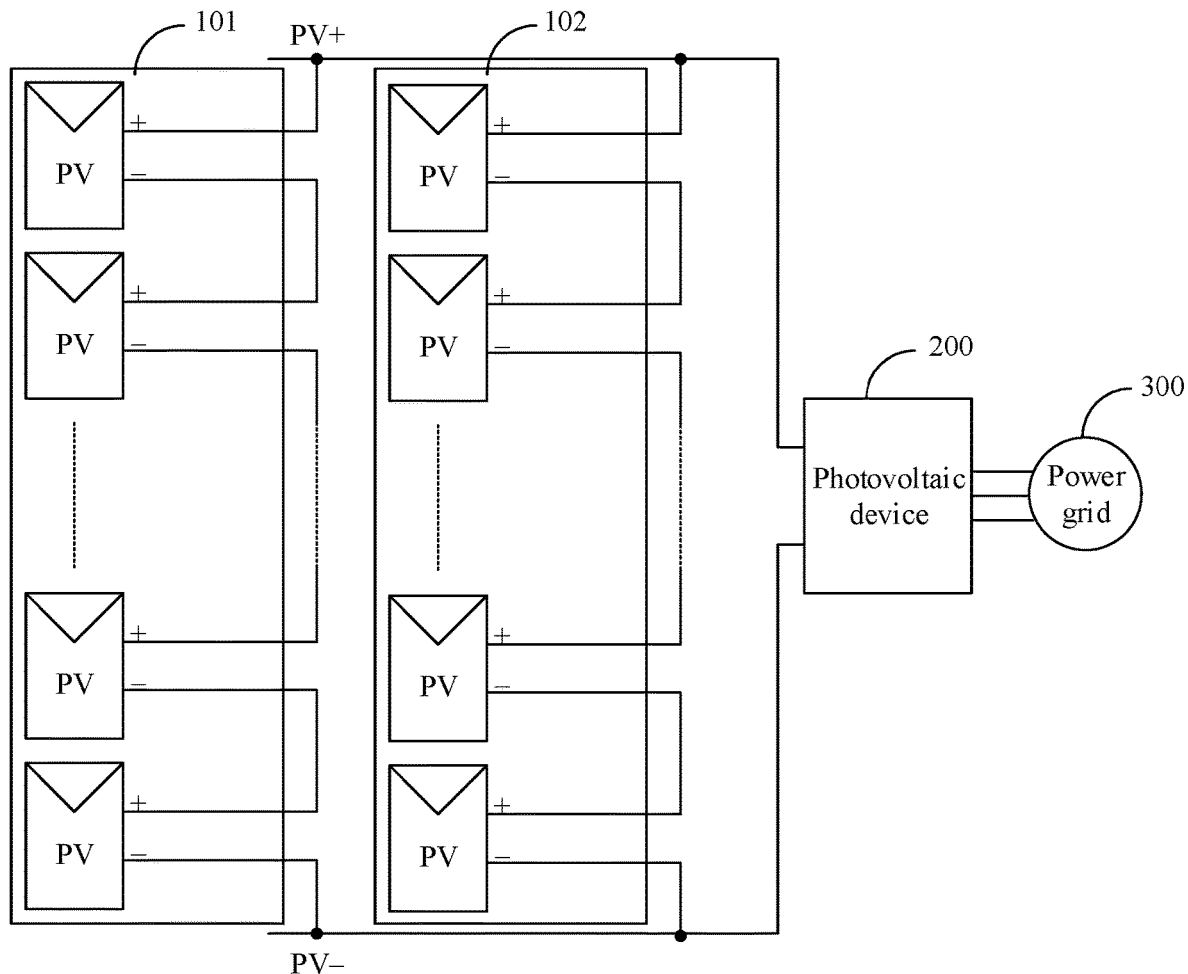
FIG. 3 is a schematic diagram of photovoltaic system according to an embodiment of this application.

FIG. 3 shows a specific implementation of a photovoltaic system. For a photovoltaic device in FIG. 3, refer to FIG. 2. An example in which a photovoltaic array includes two photovoltaic strings is used for description in FIG. 3.

A first photovoltaic string 101 and a second photovoltaic string 102 are connected in parallel to an input end of the photovoltaic device 200.

The first photovoltaic string 101 includes a plurality of photovoltaic modules connected in series, and similarly the second photovoltaic string 102 includes a plurality of photovoltaic modules connected in series.

Output power control of the photovoltaic device provided in this embodiment is implemented by controlling the input current of the DC-DC converter circuit. To describe the technical solutions provided in the embodiments of this application more clearly, the following first describes an IV curve graph of a photovoltaic module shown in FIG. 4, to illustrate a relationship between an output voltage and an output current of the photovoltaic module.

Figure 4:
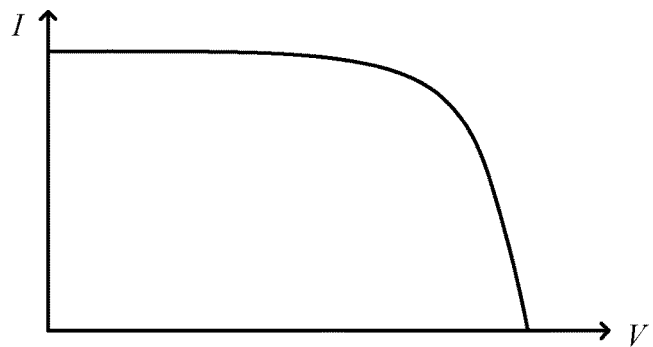
FIG. 4 is an IV curve graph of a photovoltaic module according to an embodiment of this application.

It can be seen from FIG. 4 that, for the photovoltaic module, a voltage U is inversely proportional to a current I, that is, the voltage U naturally increases as the current I decreases.

During power limiting, an input current of a DC-DC converter circuit is reduced, and an input voltage of the DC-DC converter circuit increases naturally. As the input current of the DC-DC converter circuit continues to decrease, the input voltage of the DC-DC converter circuit increases gradually. However, when the input voltage increases to a degree that exceeds a preset voltage, a control policy is changed. That is, the input current of the DC-DC converter circuit is increased instead of being reduced. It can be learned from the IV curve that when I increases, the input voltage of the DC-DC converter circuit is forced to decrease and thus the input voltage of the DC-DC converter circuit becomes lower than the preset voltage, thereby avoiding DC bus overvoltage and protecting a DC bus capacitor connected between a DC positive bus and a DC negative bus and each switching device in a photovoltaic device. If the voltage is excessively high, the voltage may exceed a voltage stress of the switching device and damage the switching device. In addition, for a buck circuit, an electric energy loss may be reduced, and power generation efficiency may be improved.

The preset voltage is less than a voltage stress of a switching device in the DC-DC converter circuit, and is less than a voltage stress of a switching device in an inverter circuit. For example, when the voltage stress of the switching device in the DC-DC converter circuit and the inverter circuit is 650 V, the preset voltage may be set to approximately 500 V in consideration of a reserved margin and a deviation voltage. The foregoing is merely an example for description, and the setting may be specifically selected based on an actual application scenario. The preset voltage is intended to protect the switching devices and the DC bus capacitor.

Figure 5:
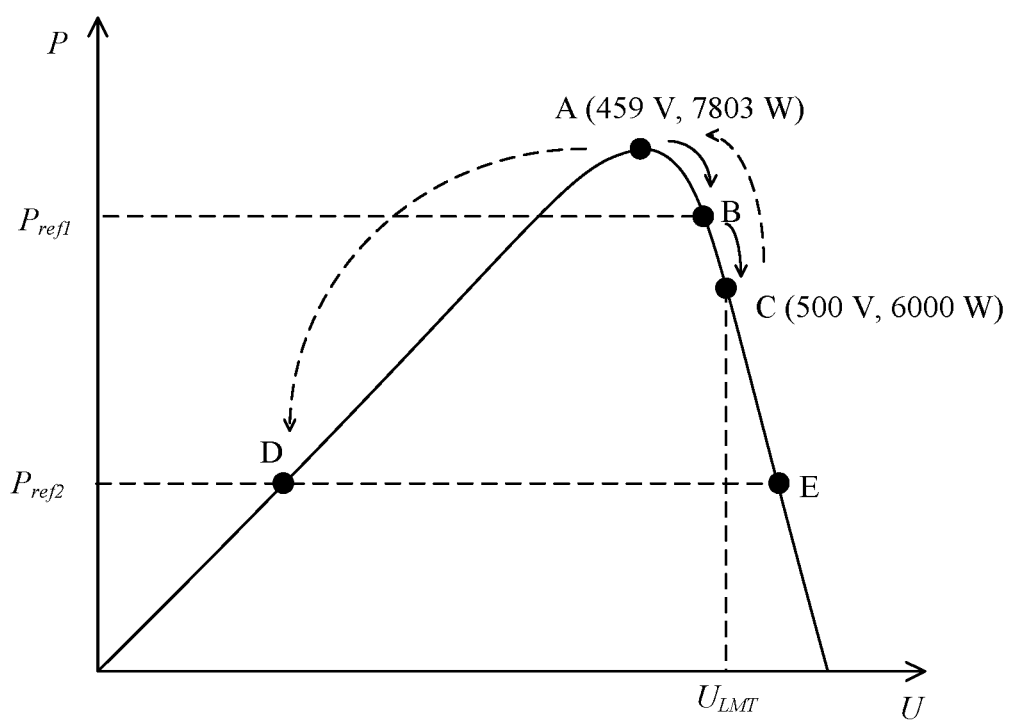
FIG. 5 is a schematic diagram of power limit control according to an embodiment of this application.

With reference to FIG. 5, the following describes in detail an implementation process of power limit control provided in this embodiment of this application.

FIG. 5 is a schematic diagram of power limit control according to an embodiment of this application.

The first photovoltaic string 101 in FIG. 3 is used as an example for description. To simplify calculation, it is assumed that the first photovoltaic string 101 includes 15 photovoltaic modules connected in series, and parameters of all photovoltaic modules are the same, as shown in Table 1 below. Conversion efficiency of a photovoltaic device is 100% when a loss is ignored.

TABLE 1

| Parameter | Value | Unit |
| --- | --- | --- |
| Open-circuit voltage (Voc) | 38.25 | V |
| Short-circuit current (Isc) | 9.95 | A |
| MPPT voltage Vmp | 30.6 | V |
| MPPT current Imp | 8.5 | A |
| MPPT power Pmp | 260.1 | W |

If an output power of the photovoltaic device is not limited, that is, during normal grid-connected power generation, the photovoltaic device operates at a maximum power point A, as shown in FIG. 5. Because one photovoltaic string includes 15 photovoltaic modules, Pmp of one photovoltaic module of one photovoltaic string is 260.1 W.

A photovoltaic array includes two photovoltaic strings connected in parallel, so Pmpp of the entire photovoltaic array is 260.1*15*2=7803 W.

Because one photovoltaic string includes 15 photovoltaic modules, and two photovoltaic strings are connected in parallel, output voltages are the same. Vmp of one photovoltaic module is 30.6 V, so Vmpp corresponding to the entire photovoltaic string is 30.6*15=459 V. An input voltage corresponding to the maximum power point is 459 V.

The following describes two cases with reference to FIG. 5. One case is that an input voltage is less than a preset voltage during power limiting, and the other is that the input voltage is greater than or equal to the preset voltage during power limit control.

It is assumed that the preset voltage Ulmt is set to 500 V, and a power corresponding to the photovoltaic string is 6000 W.

First case: The input voltage is less than the preset voltage during power limit control.

In this case, because an input voltage of a DC-DC converter circuit is less than the preset voltage, the input voltage does not cause DC bus overvoltage. Therefore, for more stable operation, the photovoltaic device may be controlled to operate at a first operating point to the right of the maximum power point.

If a controller receives a power scheduling instruction, and a power reference value $P_{ref1}$ carried in the power scheduling instruction is 7000 W, the controller reduces an input current of the DC-DC converter circuit to increase the input voltage of the DC-DC converter circuit because $P_{ref1}$=7000 W<$P_{mpp}$=7803 W.

During specific implementation, the controller reduces an input current reference value Iref of the DC-DC converter circuit, and controls decrease of the input current of the DC-DC converter circuit based on the input current reference value Iref. It can be learned from an IV curve that the input voltage of the DC-DC converter circuit increases as the input current decreases.

As the input voltage of the DC-DC converter circuit increases, when the photovoltaic device begins operating at a first operating point B to the right of the maximum power point A, that is, when $P_{ref1}=U_{in} \times I_{in}$, the input current reference Iref remains unchanged, and an inverter stably operates at the first operating point B to the right of the maximum power point.

Second case: The input voltage is greater than or equal to the preset voltage during power limit control.

If a power reference value Prep carried in a power scheduling instruction received by the photovoltaic device is 3000 W, similar to the foregoing process, an input current reference value Iref of a DC-DC converter circuit also needs to be reduced first, and decrease of an input current of the DC-DC converter circuit is controlled based on the input current reference value Iref. It can be learned from an IV curve that an input voltage of the DC-DC converter circuit increases as the input current decreases.

When the photovoltaic device begins operating at a point C, that is, $U_{in}=U_{lmt}$=500 V, and in this case, $U_{in} \times I_{in}$=6000 W>$P_{ref2}$, the photovoltaic device has not reached a stable operating point because 6000 W>$P_{ref2}$=3000 W, and the output power needs to be further reduced. However, the continuous increase of the input voltage may cause DC bus overvoltage and damage a DC bus capacitor and a switching device. Therefore, for the purpose of protection, the input voltage needs to be reduced.

To be specific, a controller increases the input current reference value of the DC-DC converter circuit, and controls increase of the input current of the DC-DC converter circuit based on the input current reference value. Along with the increase of the input current, according to the IV curve, the input voltage naturally decreases, and when the photovoltaic device begins operating at a second operating point D to the left of the maximum power point A, that is, when a corresponding power is $P_{ref2}$, the input current reference value remains unchanged, and an inverter stably operates at the second operating point D to the left of the maximum power point. The dynamic adjustment process is A→B→C→D.

It should be noted that, in the controlling process from the point C to the point D, to meet a requirement, an adjustment speed may be controlled, so that the adjustment process from the point C to the point D is sped up as quick as possible.

It can be learned from the foregoing description that during the power limit control, adjustment is first made by the photovoltaic device for power limit adjustment provided in this embodiment to the right of the maximum power point A, and when the input voltage is greater than or equal to the preset voltage, reverse adjustment is made until the photovoltaic device is adjusted to operate at the point to the left of the maximum power point A and the operation at an operating point corresponding to the power reference value is stable. Because in the adjustment process, a voltage value corresponding to a power cannot be predicted, and with different illumination, output voltage values of the photovoltaic array are different, the adjustment can only be made to the right first, and whether the voltage exceeds the preset voltage is gradually determined. When the voltage exceeds the preset voltage, an adjustment direction is changed to a leftward adjustment. However, in a conventional adjustment mode, during a power limit adjustment process, an input voltage is not considered, and only a power-limited value is adjusted as required, that is, an inverter circuit outputs a power corresponding to a power reference value regardless of a corresponding input voltage value. For example, when the power reference value is Prep, the conventional adjustment mode is A→B→C→E. A voltage corresponding to a point E is greater than a preset voltage, so DC bus overvoltage may be caused, a DC bus capacitor and a switching device may be damaged, and thus service lives of the DC bus capacitor and the switching device may be shortened.

In the photovoltaic device 200 shown in FIG. 2, the DC-DC converter circuit 201 and the inverter circuit 202 are integrated in the inverter; and the controller 203 is a controller of the inverter. That is, the photovoltaic device 200 may be a two-stage inverter. The controller of the inverter controls the input current of the inverter to adjust the output power. Because the input voltage changes along with a process of adjusting the input current, values of the input voltage and the preset voltage need to be determined to adjust an input voltage reference value.

Photovoltaic Device Embodiment 2

The following describes another photovoltaic device for a scenario in which a photovoltaic system includes a combiner box, the combiner box includes a DC-DC converter circuit, and an inverter includes only an inverter circuit.

Figure 6:
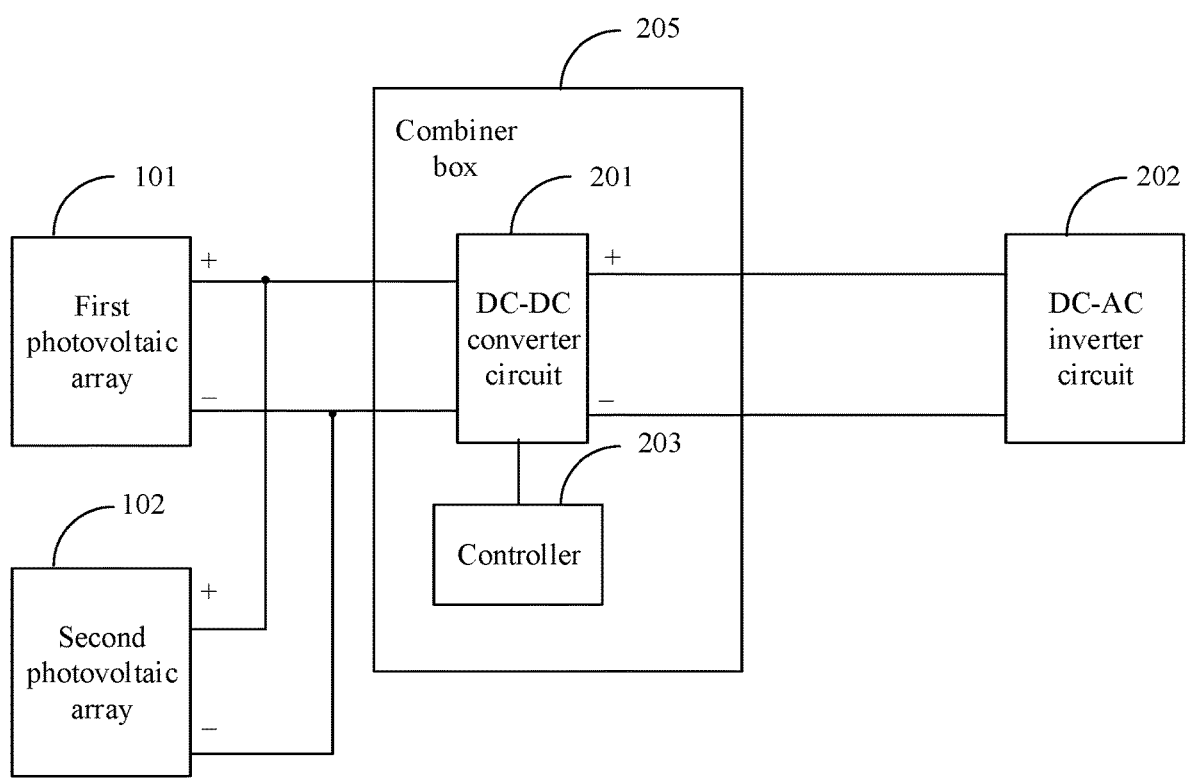
FIG. 6 is a schematic diagram of another photovoltaic device according to an embodiment of this application.

FIG. 6 is a schematic diagram of another photovoltaic device 200 according to an embodiment of this application.

The photovoltaic device provided in this embodiment includes a combiner box 205 and a DC-AC inverter circuit 202. The DC-AC inverter circuit 202 is disposed independently of the combiner box 205, that is, is a single-stage inverter disposed separately, and a DC-DC conversion function is implemented by the combiner box 205.

A DC-DC converter circuit 201 is integrated in the combiner box. An output end of the combiner box 205 is connected to an input end of the inverter circuit 202.

A controller 203 is a controller of the combiner box 205.

An input end of the combiner box 205 is connected to a first photovoltaic array 101 and a second photovoltaic array 102. Output ends of the first photovoltaic array 101 and the second photovoltaic array 102 are connected in parallel to get connected to the input end of the combiner box 205. FIG. 6 is just a schematic diagram in which the first photovoltaic array 101 and the second photovoltaic array 102 are connected in parallel outside the combiner box 205. Alternatively, the first photovoltaic array 101 and the second photovoltaic array 102 may be connected in parallel inside the combiner box 205. This is not specifically limited in this embodiment of this application.

The following describes an operating process of power control in detail with reference to a method flowchart.

Figure 7:
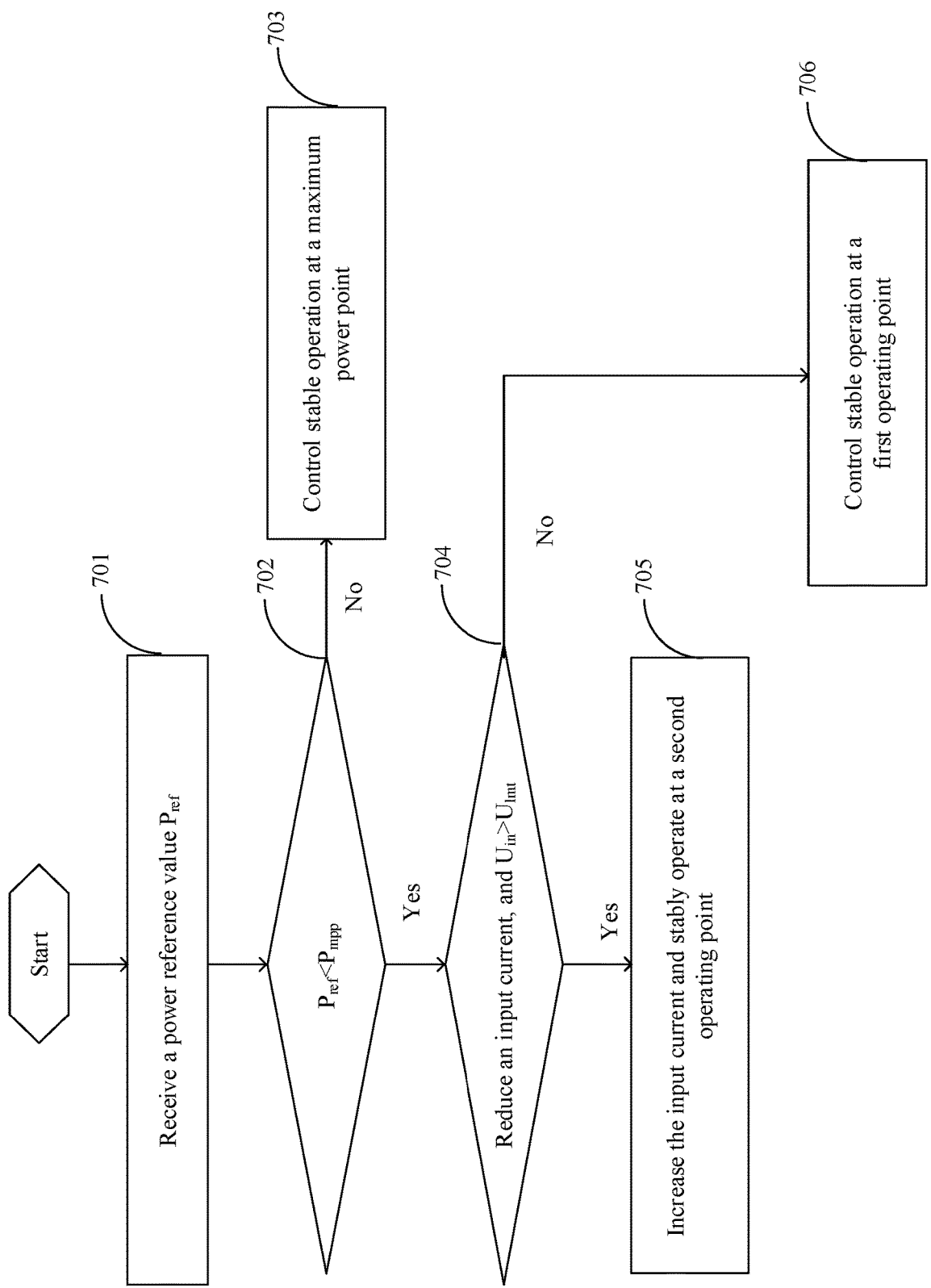
FIG. 7 is a flowchart of power control according to an embodiment of this application.

FIG. 7 is a flowchart of power control according to an embodiment of this application.

S701: Receive a power scheduling instruction, where the power scheduling instruction carries a power reference value Pref.

S702: Determine whether the power reference value Pref is less than a power Pmpp at a maximum power point, and if he power reference value Pref is less than the power Pmpp at the maximum power point, perform S704; otherwise, perform S703.

S703: Control stable operation at the maximum power point, that is, when Pref>Pmpp, control output of the power at the maximum power point, that is, perform MPPT control.

S704: Reduce an input current, that is, reduce the input current by reducing an input current reference value. As the input current decreases, an input voltage increases accordingly. Therefore, it is necessary to determine whether the input voltage Uin is greater than a preset voltage Ulmt. If yes, perform S705; otherwise, perform S706.

S705: Because Uin>Ulmt, Uin needs to be reduced. To reduce Uin, the input current reference value, that is, the input current, needs to be increased, to force Uin to be reduced, so as to stably operate at a second operating point, that is, a point to the left of a point A.

S706: When a case in which Uin>Ulmt does not occur in a power reduction process, stably operate at a first operating point, that is, a point to the right of the point A.

The following briefly describes reasons for relatively high stability when operation is performed at a point to the right of the maximum power point. With reference to FIG. 4, it can be learned from the typical IV curve that an equivalent internal resistance of a photovoltaic module changes sharply with variation of the voltage V, to be specific, R=dv/di. The equivalent internal resistance is relatively small when near an open-circuit voltage, which is approximately a constant voltage source characteristic; and the equivalent internal resistance is quite large when near a short-circuit voltage, which is approximately a constant current source characteristic. When the equivalent internal resistance tends to infinity, conditions for operating stability are the strictest, that is, an equivalent internal resistance of a point to the right of the maximum power point is relatively small, and corresponding operating stability is relatively good. Therefore, it is usually desirable to operate at a point in a region to the right, that is, for a power, it is desirable to operate at a first operating point corresponding to the power.

In the foregoing control process, an output power Pout of an inverter needs to be obtained, and whether Pout is equal to Pref needs to be determined. If Pout is not equal to Pref, the control needs to continue. If Pout is equal to Pref, it indicates that the power limit adjustment is finished, the control may be stopped, and stable operation is performed in a power limit state. The output power of the inverter may be specifically obtained by detecting an output voltage and an output current of the inverter.

An input current reference value of the inverter is a result of closed loop control of an outer loop. However, closed loop control of an inner current loop needs to be performed on the inverter, that is, an input current of the inverter is controlled based on the input current reference value of the inverter, to control the input current of the inverter to be equal to the input current reference value. To be specific, the input current of the inverter may be periodically detected, a detected input current is compared with the input current reference value, and a duty ratio of a drive pulse signal of a switching device in the inverter is controlled based on a current comparison result, so as to control a value of the input current of the inverter. For example, the specific current closed-loop control may be implemented by using a proportional-integral regulator.

In FIG. 6, only two photovoltaic arrays are used as an example for description. During specific implementation, a quantity of photovoltaic arrays connected to an input end of a single combiner box is not limited. Similarly, to increase power output, a plurality of combiner boxes may correspond to a same inverter circuit, that is, correspond to a same inverter. Output ends of the plurality of combiner boxes may be connected in parallel outside the inverter, or may be connected in parallel inside the inverter. This is not specifically limited in this embodiment.

Figure 8:
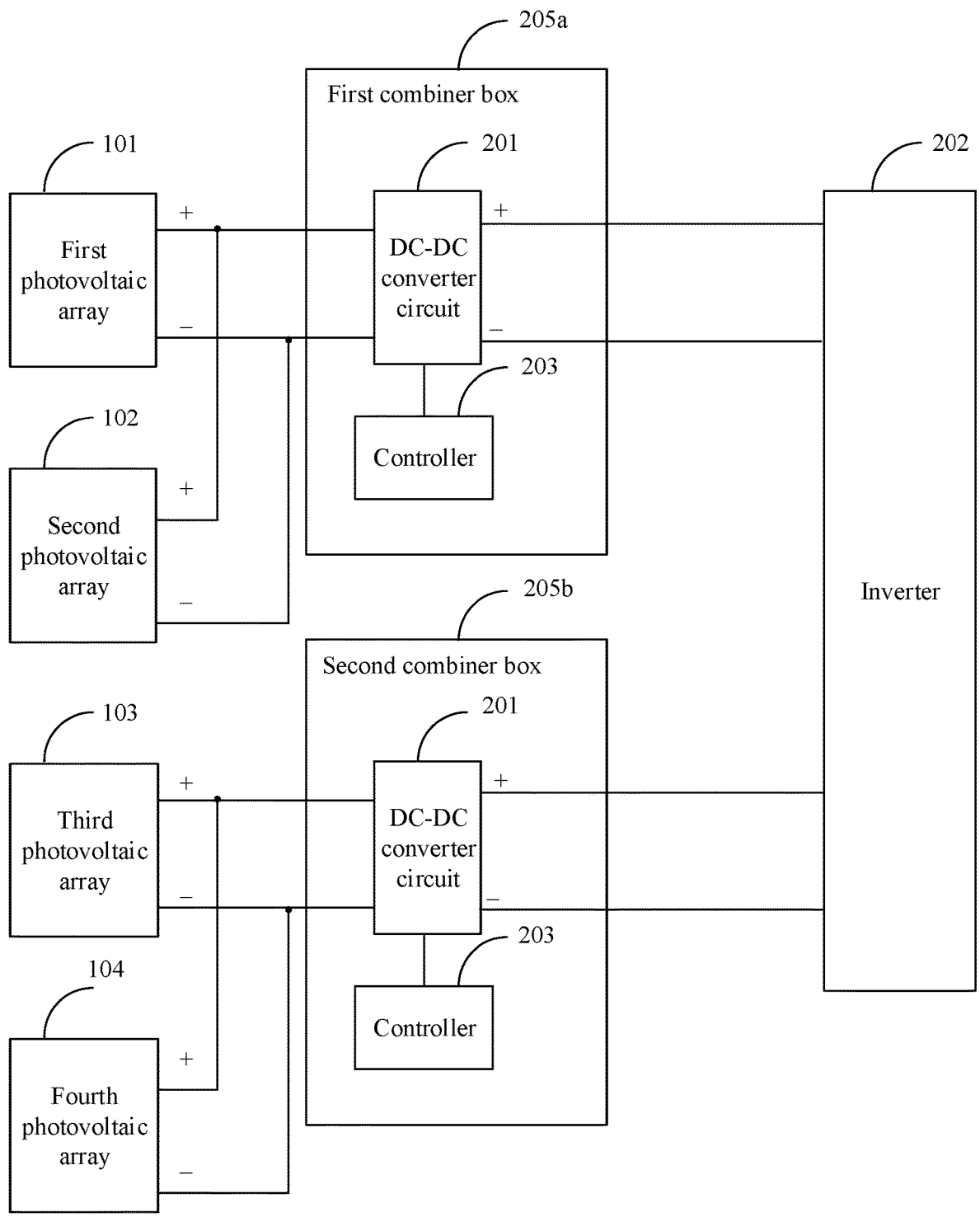
FIG. 8 is a schematic diagram of a photovoltaic device in which two combiner boxes connected in parallel according to an embodiment of this application.

For a scenario in which a plurality of combiner boxes are connected in parallel, refer to FIG. 8. Two combiner boxes are used as an example for description, namely, a first combiner box 205a and a second combiner box 205b. An input end of the second combiner box 205b is connected to a third photovoltaic array 103 and a fourth photovoltaic array 104 that are connected in parallel.

Output ends of the first combiner box 205a and the second combiner box 205b are both connected to an inverter, and the output ends may be connected in parallel inside the inverter 202, or may be connected in parallel outside the inverter 202 before getting connected to an input end of the inverter 202.

In addition, for the photovoltaic device shown in FIG. 2, a combiner box having only a convergence function, that is, only for converging currents and not for converting a voltage, may be included in a pre-stage circuit of the DC-DC converter circuit.

In the foregoing embodiment, regardless of whether a DC-DC converter circuit is inside the combiner box or inside the inverter, an input current controlled is always an input current of the DC-DC converter circuit, and the input current of the DC-DC converter circuit is an output current of a corresponding photovoltaic array. For a scenario in which a DC-DC converter circuit is included, a DC bus is a bus between an output end of the DC-DC converter circuit and an input end of an inverter circuit, and a DC bus voltage is a voltage between a DC positive bus and a DC negative bus. Usually, a pair of DC bus capacitors are connected between the DC positive bus and the DC negative bus.

The photovoltaic devices provided above all include the DC-DC converter circuit. The following describes an operating principle of a single-stage inverter during power limiting. The single-stage inverter has only an inverter function and does not perform DC-DC conversion.

Photovoltaic Inverter Embodiment

Figure 9:
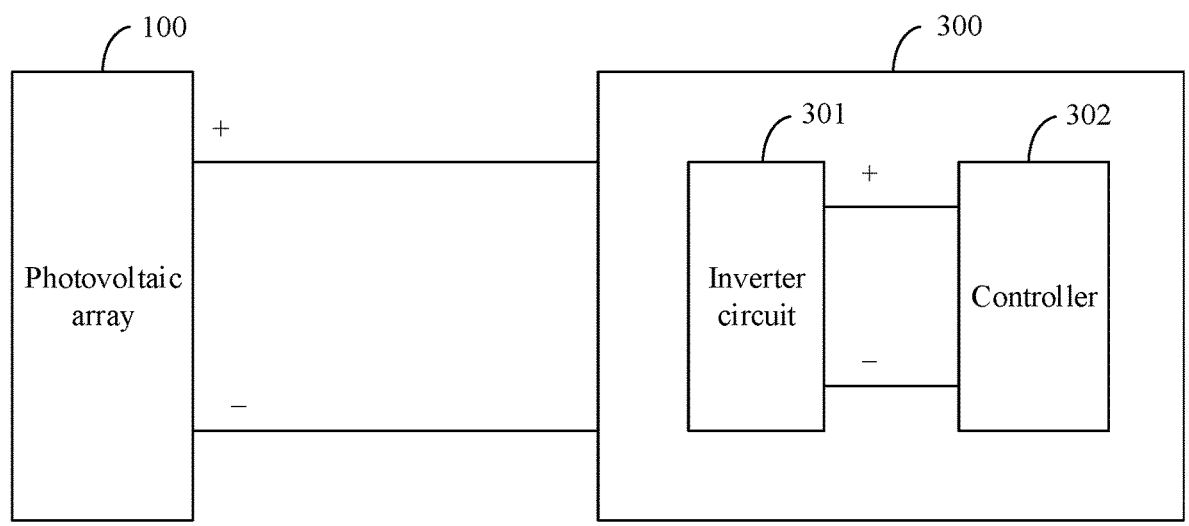
FIG. 9 is a diagram of an application scenario of a photovoltaic inverter according to an embodiment of this application.

FIG. 9 is a diagram of an application scenario of a photovoltaic inverter 300 according to an embodiment of this application.

The photovoltaic inverter 300 provided in this embodiment includes an inverter circuit 301 and a controller 302.

An input end of the inverter circuit 301 is connected to a photovoltaic array 100.

The inverter circuit 301 is configured to convert a direct current output by the photovoltaic array 100 into an alternating current output.

The controller 302 is configured to: receive a power scheduling instruction for the inverter, where the power scheduling instruction carries a power reference value; and when the power reference value is less than a power at a maximum power point, reduce an output current of the photovoltaic array, to increase an output voltage of the photovoltaic array; or when an output voltage of the photovoltaic array 100 is greater than or equal to a preset voltage, increase an output current of the photovoltaic array 100, to reduce the output voltage of the photovoltaic array 100 until an output power of the inverter becomes consistent with the power reference value.

Because the inverter provided in this embodiment does not include a DC-DC converter circuit, an input current of the inverter circuit is the output current of the photovoltaic array, and the output current of the photovoltaic array is controlled to regulate the output power of the inverter.

ADC bus of the inverter provided in this embodiment is a DC bus of an input end of the inverter. In other words, a DC bus voltage is a voltage of the input end of the inverter. A switching device is a switching device of the inverter.

The inverter provided in this embodiment can protect a switching device in the inverter circuit from impact of a high voltage and keep a voltage lower than a voltage stress of the switching device during power limit control, so that the inverter circuit operates safely and stably. Moreover, a DC bus capacitor is not impacted by the high voltage, to protect safety of the capacitor.

The preset voltage needs to be less than the voltage stress of the switching device of the inverter, and less than a withstand voltage of the DC bus capacitor, so that both the switching device and the DC bus capacitor can be protected.

For a specific implementation form of the photovoltaic array 100, refer to FIG. 3. A quantity of photovoltaic strings is not specifically limited, and a quantity of photovoltaic cell panels included in the photovoltaic string is not specifically limited, either.

In this embodiment, that the controller 302 reduces the output current of the photovoltaic array is specifically as follows:

The controller reduces an output current reference value of the photovoltaic array, and controls decrease of the output current of the photovoltaic array based on the output current reference value, where the output voltage of the photovoltaic array increases as the output current decreases.

Because a relationship between an output voltage and an output current of a photovoltaic module is shown as the IV curve in the figure, the output voltage of the photovoltaic module naturally increases when decrease of the output current of the photovoltaic module is controlled.

That the controller increases the output current of the photovoltaic array is specifically as follows:

When the output voltage of the photovoltaic array is greater than or equal to the preset voltage, the controller is configured to increase an output current reference value of the photovoltaic array, and control increase of the output current of the photovoltaic array based on the output current reference value. Similarly, it can be learned from the IV curve that when the output current of the photovoltaic array increases, the output voltage of the photovoltaic array is forcibly decreased, so as to avoid a case in which the output voltage of the photovoltaic array exceeds the preset voltage. In this way, an input voltage of the inverter does not exceed the preset voltage, thereby protecting the switching device and the DC bus capacitor of the inverter.

In addition, if the power reference value is greater than or equal to the power at the maximum power point, the controller controls the output power of the inverter to be the power at the maximum power point.

In this embodiment, a part of a specific control manner of the controller that is the same as that described above is not described herein again. Reference may be made to the description of the photovoltaic device embodiment.

It should be noted that the inverter circuit in the foregoing embodiment may operate bidirectionally, that is, implement an inverter function when operating in a forward direction, and implement a rectification function when operating in a reverse direction. When a photovoltaic system includes an energy storage device, for example, when the photovoltaic array does not output electric energy, the inverter circuit may rectify an alternating current of an alternating current grid into a direct current for charging the energy storage device.

Based on the photovoltaic device and the inverter provided in the foregoing embodiments, an embodiment of this application further provides a photovoltaic system. The photovoltaic system may include the photovoltaic device described in the foregoing embodiments, or include the inverter described in the foregoing embodiment. The following describes in detail with reference to the accompanying drawings.

Photovoltaic System Embodiment

Figure 10:
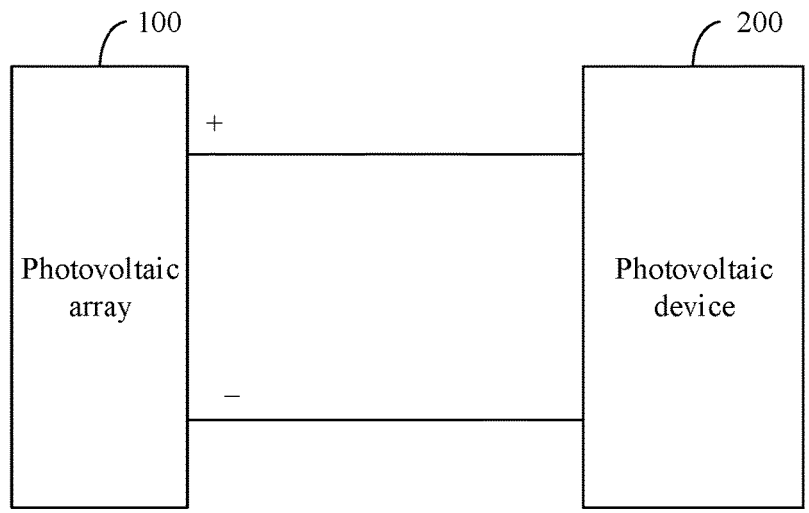
FIG. 10 is a schematic diagram of a photovoltaic system including a photovoltaic device according to an embodiment of this application.

FIG. 10 is a schematic diagram of a photovoltaic system including a photovoltaic device according to an embodiment of this application.

The photovoltaic system provided in this embodiment is described by using an example in which the photovoltaic device described in the foregoing embodiment is included, and the system further includes a photovoltaic array 100.

When the photovoltaic system includes the photovoltaic device 1001, an input end of the photovoltaic device 1001 is connected to the photovoltaic array 100.

The photovoltaic system includes the photovoltaic device described in the foregoing embodiment, and the photovoltaic device 1001 may include a DC-DC inverter circuit, an inverter circuit, and a controller. Because the photovoltaic device can control an input voltage to be less than a preset voltage when power limit control is performed, a switching device and a DC bus capacitor can be better protected, and DC bus overvoltage can be avoided when the DC-DC inverter circuit is a step-up circuit. In addition, when the DC-DC converter circuit is a step-down circuit, power consumption for electric energy conversion performed by the step-down circuit can be reduced, thereby improving power generation efficiency of the photovoltaic system.

A specific implementation form of the photovoltaic array is not limited in this embodiment. For example, the photovoltaic array may include a plurality of photovoltaic strings connected in parallel.

The following describes a photovoltaic system that includes only a single-stage inverter.

Figure 11:
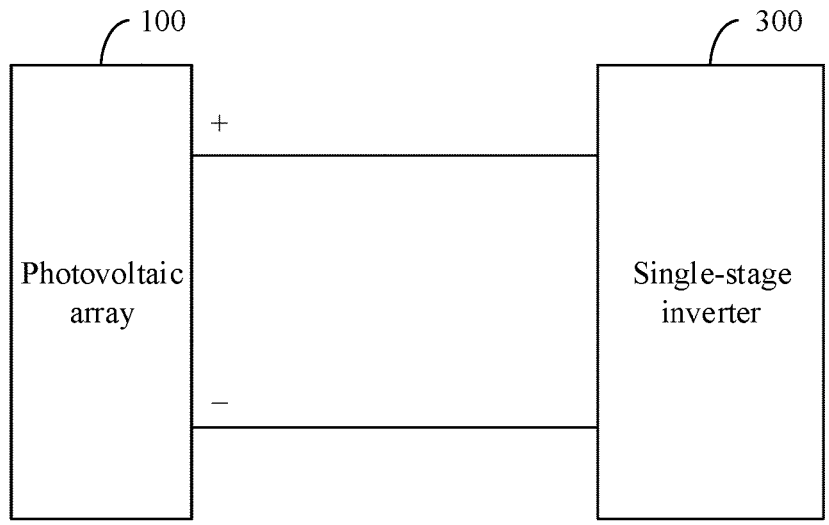
FIG. 11 is a schematic diagram of a photovoltaic system including an inverter according to an embodiment of this application.

FIG. 11 is a schematic diagram of a photovoltaic system including an inverter 300 according to an embodiment of this application.

When the photovoltaic system includes the single-stage inverter 300, an input end of the single-stage inverter 300 is connected to a photovoltaic array 100. For a specific implementation of the single-stage inverter 300, refer to FIG. 9.

A specific implementation form of the photovoltaic array is not specifically limited in this embodiment, and may be set based on an actual application scenario. For example, the photovoltaic array may include a plurality of photovoltaic strings connected in parallel, or may include one photovoltaic string.

The photovoltaic system includes the photovoltaic inverter described in the foregoing embodiment, and the photovoltaic inverter includes an inverter circuit and a controller. Because the inverter can control an input voltage to be less than a preset voltage when power limit control is performed, a switching device and a DC bus capacitor can be better protected, and DC bus overvoltage can be avoided.

Based on the photovoltaic device, the inverter, and the photovoltaic system provided in the foregoing embodiments, an embodiment of this application further provides a power limit control method. The control method may be applied to the photovoltaic device or the inverter described in the foregoing embodiments. The following describes the method in detail with reference to the accompanying drawings.

Method Embodiment 1

Figure 12:
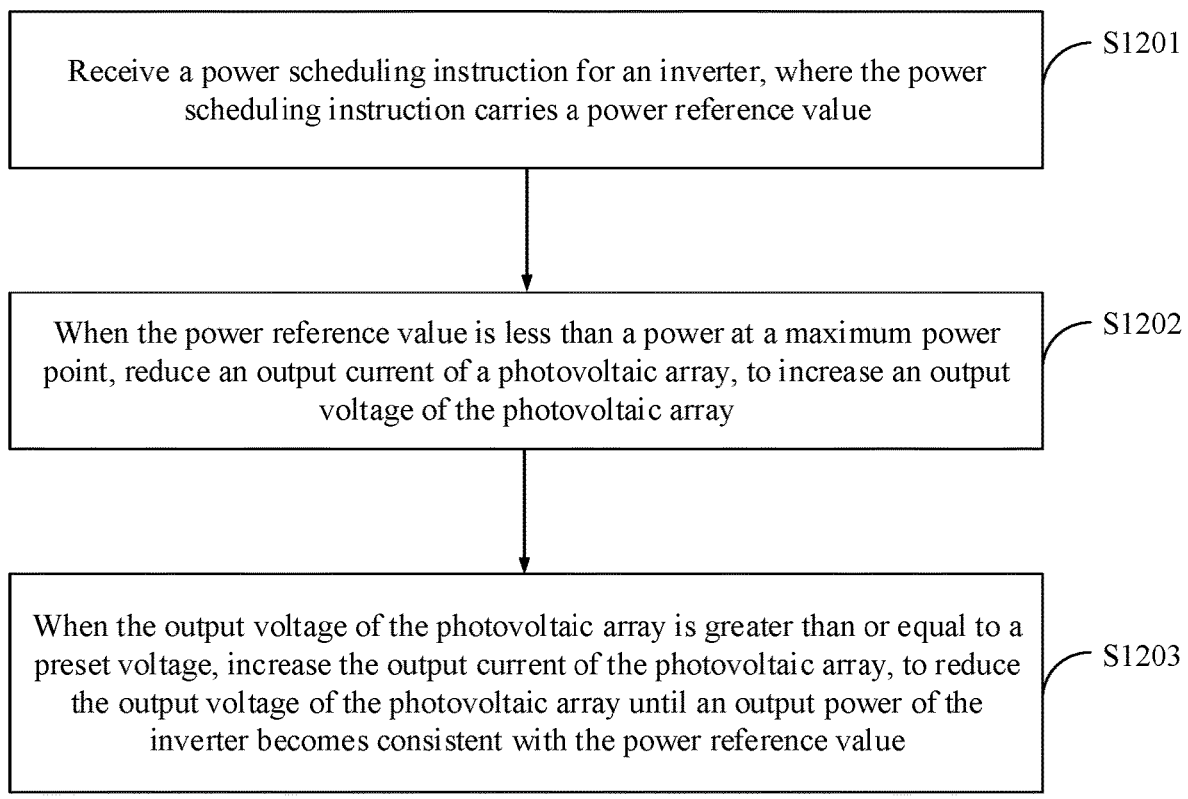
FIG. 12 is a flowchart of a power control method for photovoltaic power generation according to an embodiment of this application.

FIG. 12 is a flowchart of a power control method for photovoltaic power generation according to an embodiment of this application.

The power control method for photovoltaic power generation provided in this embodiment includes the following steps.

S1201: Receive a power scheduling instruction for an inverter, where the power scheduling instruction carries a power reference value.

A photovoltaic power station often performs power scheduling and controls operation of a photovoltaic device based on a power reference value, so that the photovoltaic device outputs a power that is consistent with the power reference value and outputs a same power as the power reference value under a strict condition. Usually, the operation is performed at a maximum power point.

S1202: When the power reference value is less than a power at the maximum power point, reduce an output current of a photovoltaic array, to increase an output voltage of the photovoltaic array.

The reducing an output current of a photovoltaic array specifically includes: reducing an output current reference value of the photovoltaic array, and controlling decrease of the output current of the photovoltaic array based on the output current reference value, where the output voltage of the photovoltaic array increases as the output current decreases.

When the power reference value is less than the power at the maximum power point, it indicates that power limit control needs to be performed. Therefore, an output power of an inverter circuit needs to be reduced. Specifically, the power may be reduced by reducing the output current of the photovoltaic array. The reducing the output current is specifically reducing the output current reference value. It should be noted that the output current of the photovoltaic array is an input current for the photovoltaic device. Due to an IV characteristic of a photovoltaic module, U naturally increases as I decreases. Therefore, to avoid damage to a switching device and a DC bus capacitor, and DC bus overvoltage that are caused by an excessively high voltage, voltage control is performed in a power limit process, which is also specifically implemented through current control.

S1203: When the output voltage of the photovoltaic array is greater than or equal to a preset voltage, increase the output current of the photovoltaic array, to reduce the output voltage of the photovoltaic array until an output power of the inverter becomes consistent with the power reference value.

The increasing the output current of the photovoltaic array specifically includes: when the output voltage of the photovoltaic array is greater than or equal to the preset voltage, increasing the output current reference value of the photovoltaic array, and controlling increase of the output current of the photovoltaic array based on the output current reference value.

When the power reference value is greater than or equal to the power at the maximum power point, the output power of the inverter is controlled to be the power at the maximum power point.

The method provided in this embodiment is applicable to the photovoltaic device and the inverter provided in all the foregoing embodiments. When the method is applied to the photovoltaic device, the output current of the photovoltaic array is an input current of a DC-DC converter circuit. When the method is applied to the single-stage inverter, the output current of the photovoltaic array is an input current of the inverter.

When the output power of the inverter is limited, the output current of the photovoltaic array is reduced, and the output voltage of the photovoltaic array increases naturally. Along with the continuous decrease of the output current of the photovoltaic array, the output voltage of the photovoltaic array increases gradually. However, when the output voltage is increased to a degree that exceeds the preset voltage, a control policy is changed. That is, the output current of the photovoltaic array is increased instead of being decreased. It can be learned from a current-voltage IV curve of the photovoltaic module that when I increases, the output voltage is forced to decrease and thus the output voltage becomes lower than the preset voltage, thereby avoiding DC bus overvoltage and protecting a DC bus capacitor connected between a DC positive bus and a DC negative bus and each switching device in the photovoltaic device or the single-stage inverter. If the voltage is excessively high, the voltage may exceed a voltage stress of the switching device and damage the switching device.

Method Embodiment 2

The following describes a complete process of power limit control in detail with reference to a flowchart.

Figure 13:
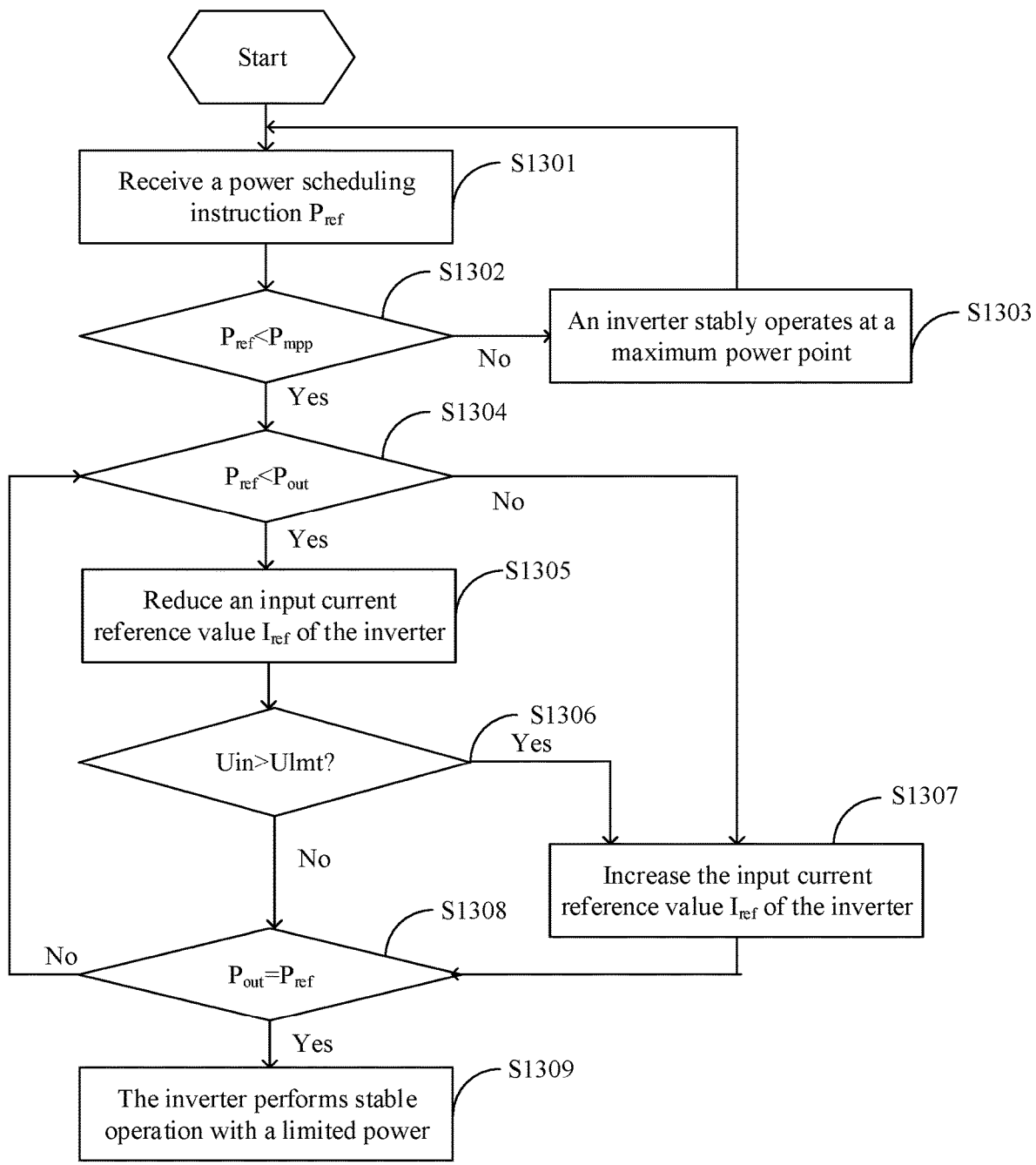
FIG. 13 is a flowchart of another power control method for photovoltaic power generation according to an embodiment of this application.

FIG. 13 is a flowchart of another power control method for photovoltaic power generation according to an embodiment of this application.

S1301: Receive a power scheduling instruction, and obtain a power reference value Pref from the power scheduling instruction.

S1302: Determine whether the power reference value is less than a power Pmpp at a maximum power point, that is, Pref<Pmpp; and if yes, perform S1304; otherwise, perform S1303.

S1303: An inverter stably operates at the maximum power point, that is, an output power Pout of the inverter is controlled to be Pmpp.

The output power of the inverter may be obtained by detecting an output voltage and an output current of the inverter.

S1304: Determine whether the power reference value is less than the output power, that is, Pref<Pout; and if yes, perform S1305; otherwise, perform S1307.

S1305: Reduce an input current reference value Iref of the inverter. For a single-stage inverter, an input current of the inverter herein is an output current of a photovoltaic array; and for a two-stage inverter, the input current of the inverter is an output current of a photovoltaic array, and also an input current of a DC-DC converter circuit.

Control of the input current reference value of the inverter is a result of closed loop control of an outer loop. However, control of the input current of the inverter belongs to closed loop control of an inner current loop. The input current of the inverter is controlled based on the input current reference value of the inverter. To be specific, the input current of the inverter may be detected, a detected input current is compared with the input current reference value, and a duty ratio of a drive pulse signal of a switching device in the inverter is controlled based on a comparison result, so as to control a value of the input current of the inverter. For example, the specific current closed-loop control may be implemented by using a proportional-integral regulator.

S1306: Determine whether an input voltage of the inverter is less than a preset voltage, that is, Uin>Ulmt; and if yes, perform S1307; otherwise, perform S1308.

S1307: Increase the input current reference value Iref of the inverter.

S1308: Determine whether the output power of the inverter reaches the power reference value, that is, determine whether Pout is equal to Pref theoretically. During actual implementation, there is usually an error in controlling, and the two may be considered as equal within an allowed error range.

S1309: The inverter performs stable operation with a limited power.

According to the method provided in this embodiment, after S1305, determining performed on the input voltage of the inverter is added. When the input voltage is greater than the preset voltage, it indicates that the voltage is relatively high. Therefore, the voltage needs to be limited to avoid DC bus overvoltage, and overvoltage of the switching device and a DC bus capacitor. Because the input current reference value needs to be increased to reduce the voltage, S1307 needs to be performed.

An implementation form of the switching device is not specifically limited in the foregoing embodiments of this application. For example, the switching device may be a controllable semiconductor switching device such as an IGBT or a MOS.

Based on the photovoltaic device, the inverter, the photovoltaic system, and the method provided in the foregoing embodiments, an embodiment of this application further provides a power control apparatus for photovoltaic power generation, including:

a receiving unit, configured to receive a power scheduling instruction for an inverter, where the power scheduling instruction carries a power reference value;

a current reduction unit, configured to: when the power reference value is less than a power at a maximum power point, reduce an output current of a photovoltaic array, to increase an output voltage of the photovoltaic array; and a current increasing unit, configured to: when the output voltage of the photovoltaic array is greater than or equal to a preset voltage, increase the output current of the photovoltaic array, to reduce the output voltage of the photovoltaic array until an output power of the inverter becomes consistent with the power reference value.

The current reduction unit specifically includes a current reduction module, configured to: reduce an output current reference value of the photovoltaic array, and control decrease of the output current of the photovoltaic array based on the output current reference value, where the output voltage of the photovoltaic array increases as the output current decreases.

The current increasing unit specifically includes a current increasing module, configured to: when the output voltage of the photovoltaic array is greater than or equal to the preset voltage, increase the output current reference value of the photovoltaic array, and control increase of the output current of the photovoltaic array based on the output current reference value.

The apparatus further includes a control unit, configured to: when the power reference value is greater than or equal to the power at the maximum power point, control the output power of the inverter to be the power at the maximum power point.

It should be noted that, the apparatus may be applied to the foregoing photovoltaic device, and in particular, applied to the controller.

It should be understood that, in this application, "at least one" means one or more, and "a plurality of" means two or more. The term "and/or" is used to describe an association relationship between associated objects, and represents that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one (piece) of a, b, or c may represent: a, b, c, "a and b", "a and c", "b and c", or "a, b, and c", where a, b, and c may be singular or plural.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A photovoltaic device, comprising a DC-DC converter circuit, an inverter circuit, and a controller, wherein
    the DC-DC converter circuit comprises an input end and an output end, the output end of the DC-DC converter circuit is connected to an input end of the inverter circuit; and
    the controller is configured to:
    receive a power scheduling instruction, wherein the power scheduling instruction carries a power reference value; and when the power reference value is less than a power at a maximum power pointI, reduce an input current of the DC-DC converter circuit, to increase an input voltage of the DC-DC converter circuit; or when an input voltage of the DC-DC converter circuit is greater than or equal to a preset voltage, increase the input current of the DC-DC converter circuit, to reduce the input voltage of the DC-DC converter circuit until an output power of an inverter equals the power reference value,
    wherein the controller is further configured to, when the power reference value is greater than or equal to the power at the maximum power point, control the output power of the inverter to be the power at the maximum power point.

2. The device according to claim 1, wherein the controller is further configured to: reduce an input current reference value of the DC-DC converter circuit, and control a decrease of the input current of the DC-DC converter circuit based on the input current reference value, wherein the input voltage of the DC-DC converter circuit increases as the input current decreases.

3. The device according to claim 1, wherein the controller is further configured to: when the input voltage of the DC-DC converter circuit is greater than or equal to the preset voltage, increase an input current reference value of the DC-DC converter circuit, and control an increase of the input current of the DC-DC converter circuit based on the input current reference value.

4. The device according to claim 1, wherein the preset voltage is less than a voltage stress of a switching device in the DC-DC converter circuit, and is less than a voltage stress of a switching device in the inverter circuit.

5. The device according to claim 1, wherein the DC-DC converter circuit and the inverter circuit are integrated in the inverter; and
    the controller is a controller of the inverter.

6. The device according to claim 1, wherein the DC-DC converter circuit is integrated in a combiner box, and an output end of the combiner box is connected to the input end of the inverter circuit; and
    the controller is a controller of the combiner box.

7. A photovoltaic inverter, comprising an inverter circuit and a controller, wherein
    the inverter circuit comprises an input and is configured to convert a direct current from the input end into an alternating current output; and
    the controller is configured to: receive a power scheduling instruction, wherein the power scheduling instruction carries a power reference value; and when the power reference value is less than a power at a maximum power point, reduce an output current of the alternating current output, to increase an output voltage of the alternating current output; or when an output voltage of the alternating current output is greater than or equal to a preset voltage, increase an output current of the alternating current output, to reduce the output voltage of the alternating current output until an output power of the inverter equals the power reference value,
    wherein the controller is further configured to, when the power reference value is greater than or equal to the power at the maximum power point, control the output power of the inverter to be the power at the maximum power point.

8. The inverter according to claim 7, wherein the controller is further configured to: reduce an output current reference value of the alternating current output, and control a decrease of the output current of the alternating current output based on the output current reference value, wherein the output voltage of the alternating current output increases as the output current decreases.

9. The inverter according to claim 7, wherein the controller is further configured to: when the output voltage of the alternating current output is greater than or equal to the preset voltage, increase an output current reference value of the alternating current output, and control an increase of the output current of the alternating current output based on the output current reference value.

10. A photovoltaic system, comprising the photovoltaic device according to claim 1, and further comprising a photovoltaic array, wherein
when the system comprises the photovoltaic device, an input end of the photovoltaic device is connected to the photovoltaic array.

11. A power control method for photovoltaic power generation, comprising:
receiving a power scheduling instruction, wherein the power scheduling instruction carries a power reference value; and
when the power reference value is less than a power at a maximum power point, reducing an output current of a photovoltaic array, to increase an output voltage of the photovoltaic array; or
when an output voltage of a photovoltaic array is greater than or equal to a preset voltage, increasing an output current of the photovoltaic array, to reduce the output voltage of the photovoltaic array until an output power of the inverter becomes consistent with the power reference value; and
when the power reference value is greater than or equal to the power at the maximum power point, controlling the output power of the inverter to be the power at the maximum power point.

12. The control method according to claim 11, wherein the reducing the output current of the photovoltaic array specifically comprises:
reducing an output current reference value of the photovoltaic array, and controlling a decrease of the output current of the photovoltaic array based on the output current reference value, wherein the output voltage of the photovoltaic array increases as the output current decreases.

13. The control method according to claim 12, wherein the increasing the output current of the photovoltaic array when the output voltage of the photovoltaic array is greater than or equal to the preset voltage specifically comprises:
when the output voltage of the photovoltaic array is greater than or equal to the preset voltage, increasing the output current reference value of the photovoltaic array, and controlling an increase of the output current of the photovoltaic array based on the output current reference value.

* * * * *